(12) United States Patent  (10) Patent No.: US 7,448,799 B2
Juhng et al.  (45) Date of Patent: Nov. 11, 2008

(54) DUAL USE THERMOMETER

(75) Inventors: Leslie Juhng, Philadelphia, PA (US); Velissa Van Scoyoc, Pottstown, PA (US); Mathieu Turpault, Berwyn, PA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 11/599,287

(22) Filed: Nov. 15, 2006

(65) Prior Publication Data

US 2008/0112465 A1  May 15, 2008

(51) Int. Cl.
*G01K 1/14* (2006.01)
*G01K 1/08* (2006.01)
*A61B 5/01* (2006.01)

(52) U.S. Cl. .................. 374/208; 374/163; 600/549
(58) Field of Classification Search ............... 374/208, 374/163, 187–188, 121; 500/549, 474; D10/52–60, D10/80, 103
See application file for complete search history.

(56) References Cited

U.S. PATENT DOCUMENTS

| D158,067 | S | * | 4/1950 | Gordenier | D10/57 |
| D378,282 | S | * | 3/1997 | Hartwein | D10/57 |
| 5,709,476 | A | * | 1/1998 | Wu et al. | 374/208 |
| 6,090,050 | A | * | 7/2000 | Constantinides | 600/549 |
| 6,241,384 | B1 | * | 6/2001 | Pompei et al. | 374/126 |
| 6,406,182 | B1 | * | 6/2002 | Chen | 374/208 |
| 6,501,384 | B2 | * | 12/2002 | Chapman et al. | 340/584 |
| 6,751,497 | B2 | * | 6/2004 | Fraden | 600/474 |
| D525,886 | S | * | 8/2006 | Russak et al. | D10/57 |
| 7,213,969 | B2 | * | 5/2007 | Russak et al. | 374/208 |
| 2001/0040911 | A1 | * | 11/2001 | Rubenstein | 374/141 |
| 2002/0126734 | A1 | * | 9/2002 | Murtishaw et al. | 374/179 |
| 2002/0186745 | A1 | * | 12/2002 | Pompei et al. | 374/121 |
| 2003/0202558 | A1 | * | 10/2003 | Chung et al. | 374/155 |
| 2003/0212340 | A1 | * | 11/2003 | Lussier et al. | 600/549 |
| 2004/0109491 | A1 | * | 6/2004 | Chen | 374/163 |
| 2004/0170216 | A1 | | 9/2004 | Russak et al. | |
| 2004/0264546 | A1 | * | 12/2004 | Wong et al. | 374/209 |
| 2005/0245839 | A1 | * | 11/2005 | Stivoric et al. | 600/549 |
| 2006/0020179 | A1 | * | 1/2006 | Anderson et al. | 600/309 |
| 2006/0026971 | A1 | * | 2/2006 | Sharpe | 62/126 |
| 2006/0189884 | A1 | * | 8/2006 | Lussier et al. | 600/549 |

* cited by examiner

*Primary Examiner*—Edward Lefkowitz
*Assistant Examiner*—Bret Adams
(74) *Attorney, Agent, or Firm*—Alan W. Fiedler; Roylance Abrams Berdo & Goodman LLP

(57) ABSTRACT

A thermometer for measuring body temperature in two different regions of a patient's body is provided. The thermometer includes a body and a probe fastened to the body. The probe has a tip portion disposed away from the body, and a temperature sensor is disposed on the tip of the probe. A supporting arm is pivotably attached to the body so that it can pivot between a closed position and an open position. In the closed position, the arm nests with the body so that the probe may be used to measure oral or rectal temperature. In the open position, the arm is positioned away from the body to provide a retaining surface for positioning the probe to measure axillary temperature.

20 Claims, 7 Drawing Sheets

DUAL USE THERMOMETER

CROSS-REFERENCE TO RELATED PATENT APPLICATION

This application is related to a design patent application titled "Dual Use Thermometer," filed concurrently herewith, and having Ser. No. 29/268,871, the entire disclosure of which is hereby incorporated by reference.

FIELD OF THE INVENTION

The present invention relates to a thermometer for measuring a patient's body temperature. More particularly, the present invention relates to a thermometer which may be used to measure body temperatures in two or more different body regions, such as the oral, rectal and axillary regions.

BACKGROUND

Thermometers are commonly used to measure a patient's body temperature. Typically, the body temperature is measured in one of the oral, rectal or axillary regions. With infant children, the rectal region is often preferred because it produces the most accurate reading of body temperature. As children become older, however, the oral and axillary regions become more convenient and more widely used.

A typical electronic thermometer measures temperature by using a temperature sensor, such as a thermistor, placed on the tip of a probe. To accurately measure temperature, the tip of the probe must be placed at an accurate position, and held stably in that position for a designated period of time. For example, to accurately measure temperature in the axillary region, the tip of the probe of a thermometer must be placed in the proper position under a child's arm. The tip should be held in place for a suitable length of time for the probe to reach a stable temperature, thereby assuring accuracy.

If only a small probe is used, however, the tip may be placed in the wrong position, or may not be held in a stable position. To prevent this, thermometers have been designed with retaining devices for maintaining the probe of the thermometer in a stable position in the axillary region. These devices, however, prevent the use of the thermometer in other body regions, such as oral or rectal regions.

Accordingly, there is a need for an improved thermometer that provides a retaining surface for taking axillary temperature while also allowing the thermometer to be used for taking oral and/or rectal temperatures.

SUMMARY OF THE INVENTION

An object of one aspect of the present invention is to address at least the above needs and to provide at least the advantages described below. Accordingly, an object of an aspect of this invention is to provide a device that may be used to measure temperature in two different regions of a patient's body.

Another object of an aspect of the present invention is to provide a retaining surface for supporting a thermometer to measure axillary temperature.

Another object of an aspect of the present invention is to provide a thermometer that displays rectal equivalent temperatures.

In accordance with an aspect of the present invention, a thermometer for measuring body temperature is provided. The thermometer includes a body and a probe having a base portion fastened to the body and a tip portion disposed away from the body. A sensor for detecting temperature is disposed on the probe. An arm is attached to the body so that it can pivot between a first position and a second position. In the first position, the arm is adjacent to the body, and in the second position the arm is positioned adjacent to the probe.

In accordance with another aspect of the present invention, a thermometer for measuring body temperature is provided. The thermometer includes a body and a probe fastened to the body. The probe has a tip portion disposed away from the body. A sensor for detecting temperature is disposed on the probe. A supporting arm is pivotably attached to the body so that it can pivot between a closed position and an open position. In the closed position, the arm is adjacent to the body and, in the open position, the arm is positioned away from the body to provide a retaining surface for positioning the probe.

In accordance with another aspect of the present invention, a thermometer for measuring body temperature is provided. The thermometer includes a probe having a base section and a tip portion, a sensor for detecting temperature disposed on the tip of the probe, and means for providing a retaining surface for positioning the probe in an accurate position.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes to and modifications of the embodiments described herein can be made without departing from the scope and spirit of the invention. Also, descriptions of well-known functions and constructions are omitted for clarity and conciseness.

Figure 1:
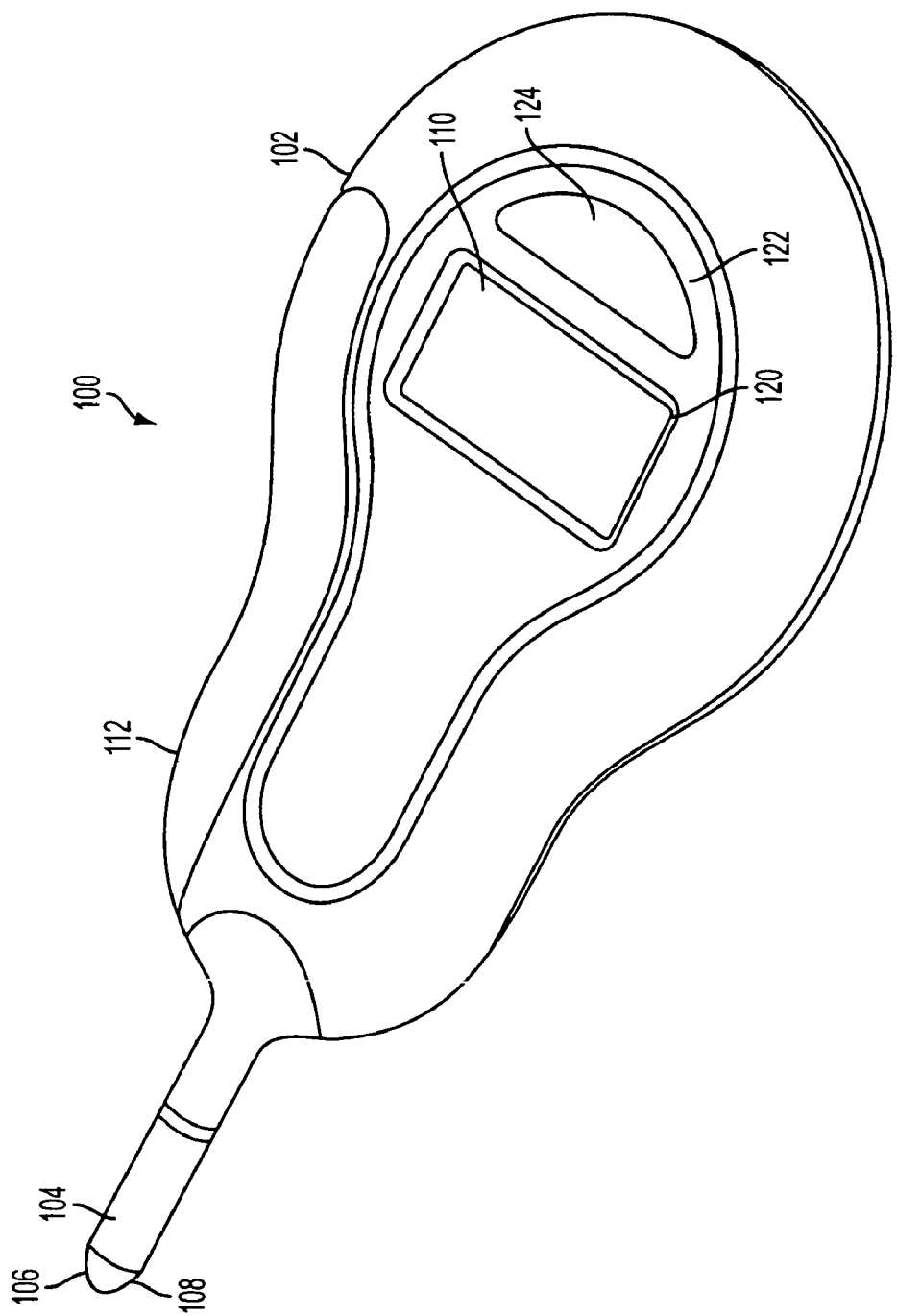
FIG. 1 is a top perspective view of an exemplary embodiment of the dual use thermometer of the present invention, with the supporting arm in a closed position.
Figure 2:
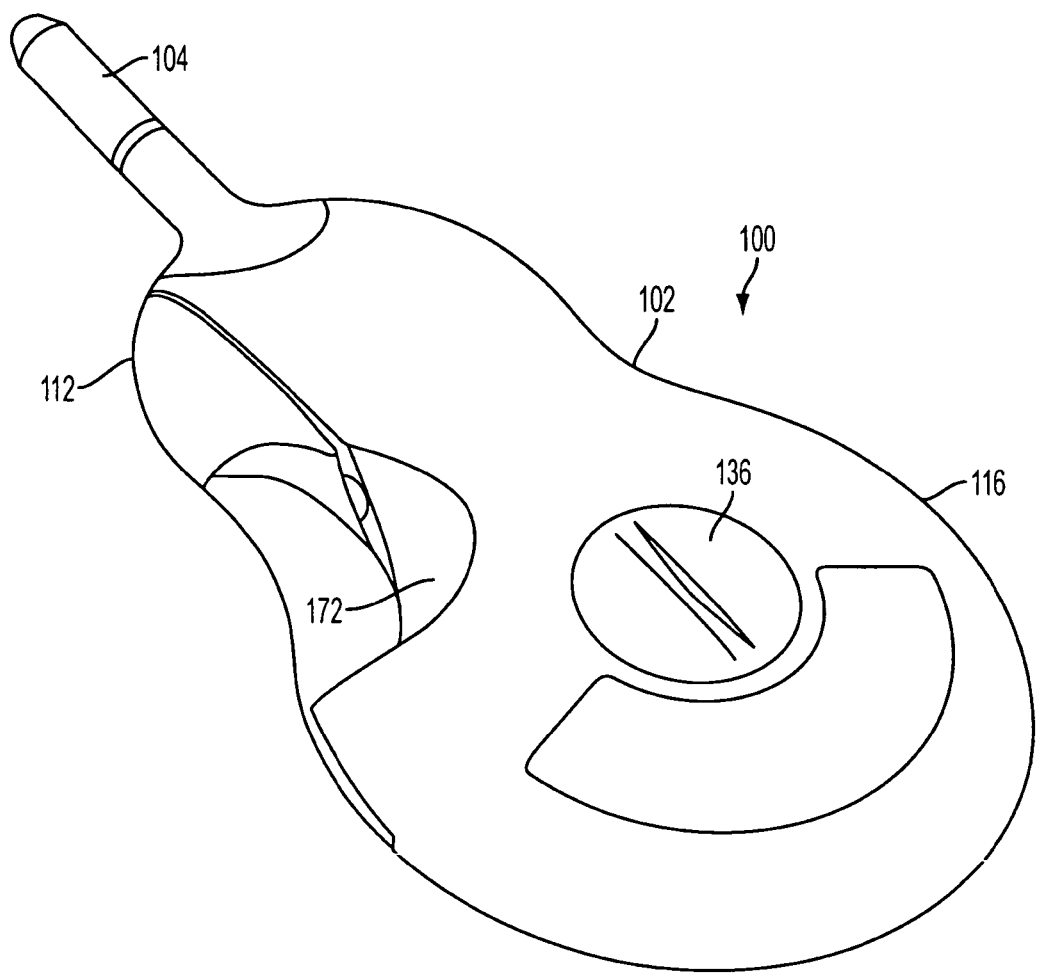
FIG. 2 is a bottom perspective view of the thermometer of FIG. 1, with the supporting arm in a closed position.
Figure 3:
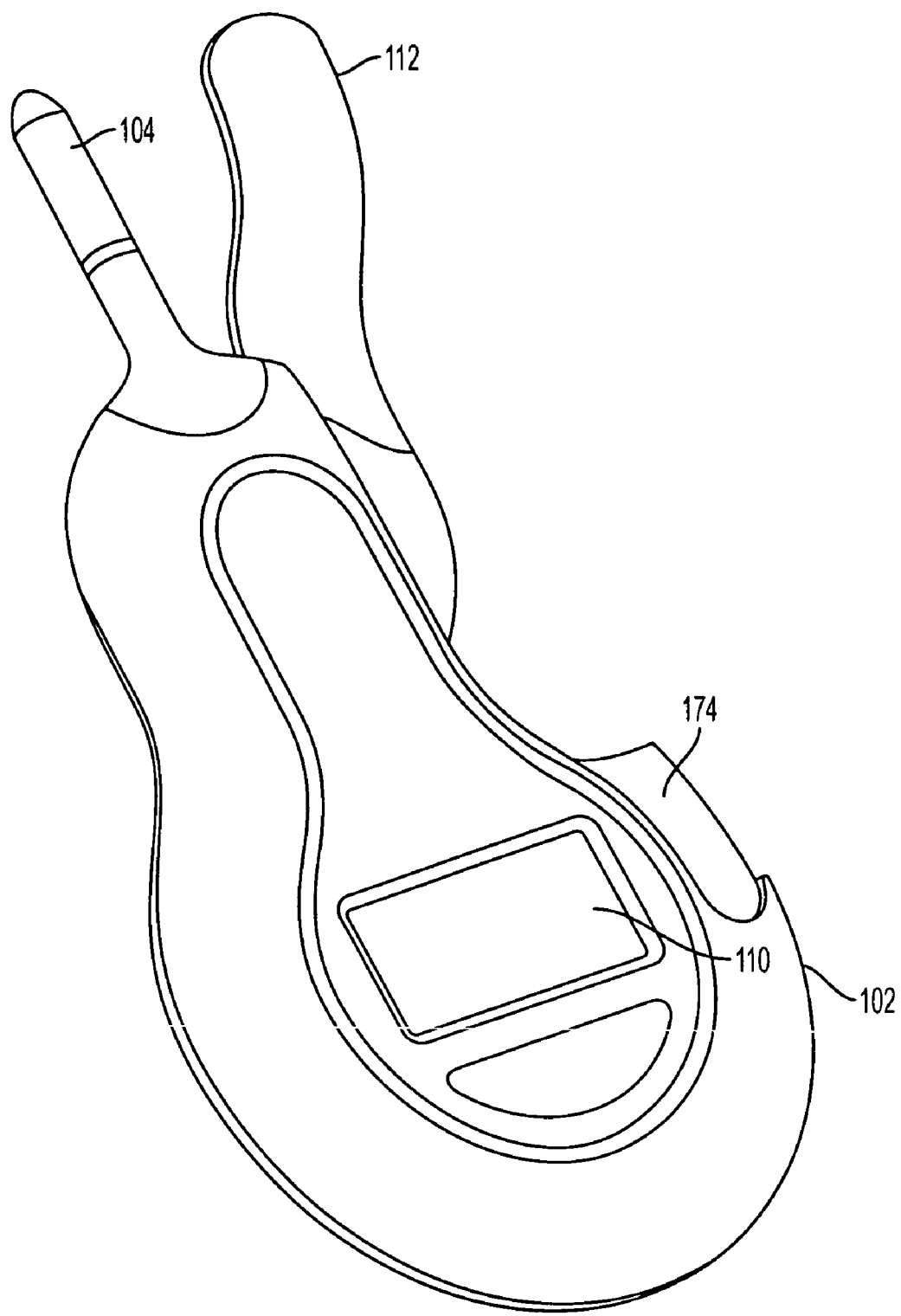
FIG. 3 is a top perspective view of the thermometer of FIG. 1, with the supporting arm in an open position.

Referring to FIGS. 1 and 2, an exemplary embodiment of a thermometer 100 in accordance with the present invention has a curved main body 102 with a probe 104 that extends from one end of the main body 102. A temperature sensor 106, such as a thermistor or other suitable device for electrically measuring temperature, is disposed at the tip 108 of the probe 104. An LCD display 110 in the main body 102 of the thermometer 100 displays the temperature measured by the temperature sensor. In FIG. 1, a supporting arm 112 is closed with respect to the main body 102 so that the thermometer 100 may be used to measure temperature at a first body region (e.g. a rectal region). In FIG. 3, the supporting arm 112 is opened away from the main body to provide a retaining surface for positioning the probe to measure temperature at a second body region (e.g. an axillary region). Thus, the thermometer may be conveniently used to measure a patient's body temperature in more than one location.

Figure 4:
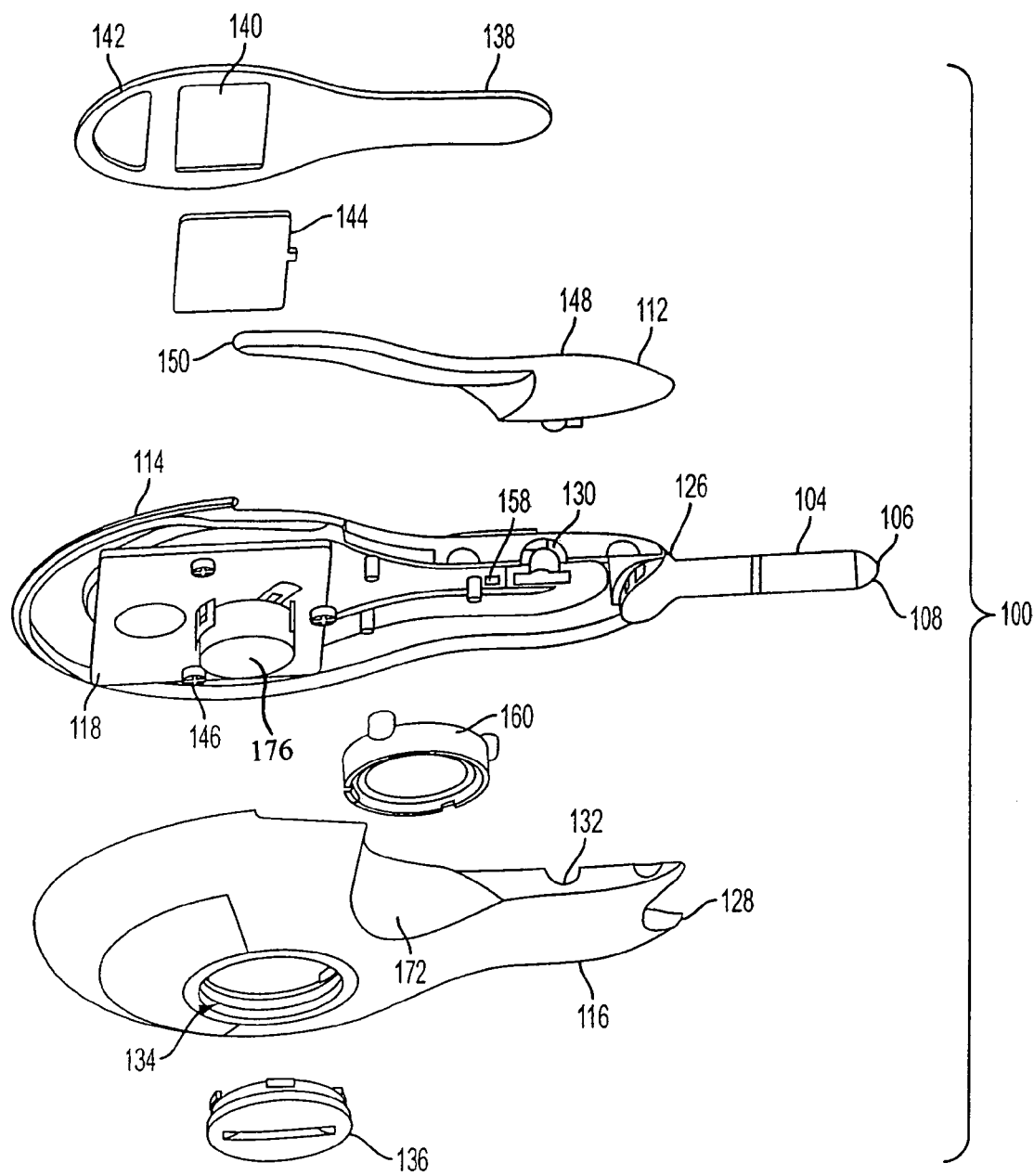
FIG. 4 is an exploded perspective view of the thermometer of FIG. 1, taken from the bottom of the thermometer.

Turning to FIG. 4, the main body of the thermometer comprises an upper shell 114 and a lower shell 116. When assembled, the upper shell 114 and the lower shell 116 form a cavity that receives a printed circuit board 118. The main body 102 is shaped so that it is convenient for a user to grip, and may be formed of any suitable plastic material, such as ABS (acrylonitrile-butadiene-styrene) or PC (Polycarbonate).

The upper shell 114 includes a first aperture 120 for receiving the display 110 mounted on the printed circuit board 118 so that the display 110 may be viewed by a user (see FIG. 1). Furthermore, the upper shell 114 has a second aperture 122 (see FIG. 1) for receiving an activation switch cover 124 (see FIG. 1). The activation switch cover 124 is a flexible, rubber, over-molded cap part. A user may press the activation switch cover 124 to activate a switch mounted on the printed circuit board 118. The switch may be used to activate various functions of the thermometer 100, such as turning on the thermometer 100, switching between Fahrenheit and Celsius temperature displays, and the like. The upper shell 114 has a recessed portion 174 (see FIG. 3) to allow the supporting arm 112 to nest with the upper shell 114 when the supporting arm 112 is closed (see FIG. 1).

A pair of opposed recesses 126, 128 are disposed at one end of the upper and lower shells 114, 116, respectively. The pair of opposed recesses 126, 128 form an aperture for engaging and receiving the probe 104 of the thermometer 100.

As seen in FIG. 4, a pair of opposed recesses 130, 132 disposed on one side of the upper and lower shells, respectively, form an aperture for receiving the supporting arm 112.

As seen in FIG. 4, the lower shell 116 of the main body 102 has a cutout portion 172 to allow a user to conveniently grasp the supporting arm 112. An opening 134 is provided in the lower shell 116 of the main body 102 to allow access to the printed circuit board 118 for such things as replacing a battery 176 used to supply power to the thermometer 100. A removable cover 136 is provided to close the opening 134.

A faceplate 138 may be disposed on the top surface of the main body 102. The faceplate 138 has first and second openings 140, 142 for receiving the display 110 and the activation switch 124 located on the upper surface of the main body 102. The faceplate 138 may be attached to the main body 102 by a snap-fit or other suitable method.

A display cover 144 is provided to cover and protect the display 110. The display cover 144 is transparent, and formed of a material such as polycarbonate, acrylic material or similar materials.

The probe 104 of the thermometer 100 is disposed in the recesses 126, 128 formed at the end of the main body 102 of the thermometer 100. The probe may be glued into place or may be held in place by a friction fit. A temperature sensor 106, or other suitable device for measuring temperature, is disposed at the tip 108 of the probe 104. The temperature sensor 106 is connected to the printed circuit board 118 by wires that pass through the center of the probe 104. The length of the probe 104 is chosen so that it is suitable for use with desired body regions. For example, the length of the probe 104 may be designed to measure rectal temperature when the supporting arm 112 is closed, and to measure axillary temperature when the supporting arm 112 is opened. As currently envisioned, the probe is about 0.53 inches long and about 0.18 inches in diameter Other configurations, such as oral temperature when closed and axillary temperature when open, are also possible.

The printed circuit board 118 is mounted to the upper shell 114 of the main body 102 by any suitable method. For example, it may be held in place by bosses 146 that pass through apertures in the circuit board, as illustrated. The printed circuit board 118 contains processing circuitry suitable for processing signals received from the temperature sensor 106 at the tip 108 of the probe 104 to determine the temperature at the probe 104, and displaying that temperature on the display 110. Such circuitry is well known to those in the relevant art, and therefore will not be described in further detail.

Figure 5:
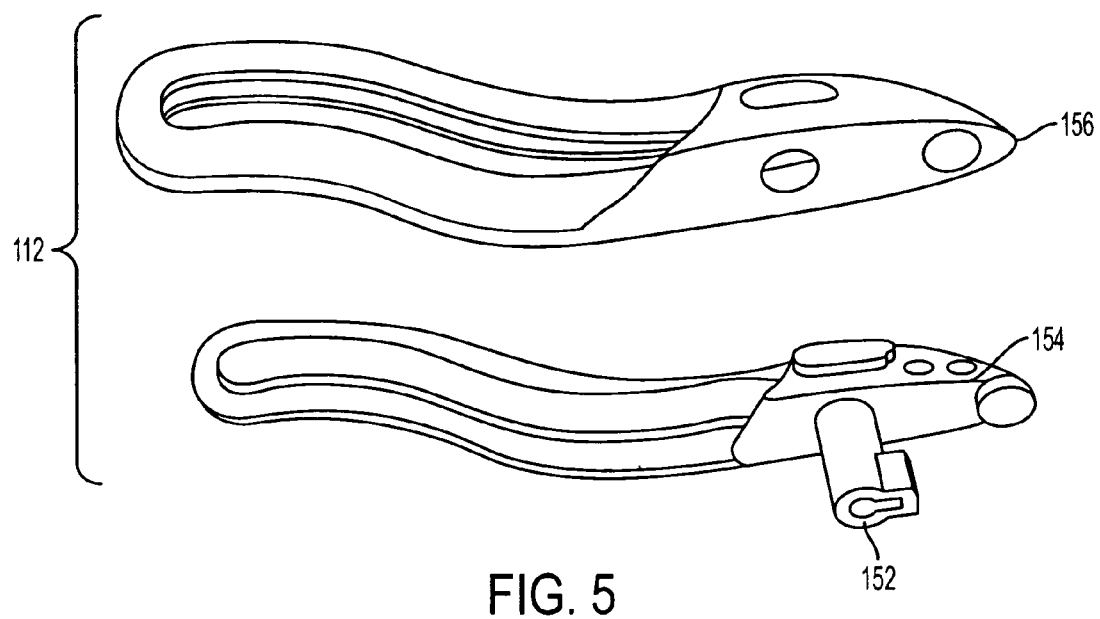
FIG. 5 is an exploded perspective view of the supporting arm of the thermometer of FIG. 1.

The supporting arm 112 of the thermometer 100 has a first end 148 and a second end 150. The first end 148 of the supporting arm 112 has a fastening protrusion 152 (see FIG. 5) which extends from the supporting arm 112 to engage the aperture formed in the side of the main body 102. The engagement of the arm to the main body 102 allows the arm to pivot or rotate between the opened and closed positions, as previously mentioned. When the arm is rotated into the open position, the second end of the arm is configured to support the probe 104 in a stable manner in an axillary region. By maintaining the probe 104 stable, a more accurate temperature reading is possible. Furthermore, a final temperature reading is reached in a shorter time when the probe 104 is maintained in a stable position, thereby potentially allowing a shorter reading time.

The supporting arm 112 may be formed in two pieces. A first, inner piece 154 cooperates with and engages a second, outer piece 156 to form the supporting arm 112.

The fastening protrusion 152 of the supporting arm 112 may be configured to activate a mode switch 158 (see FIG. 6) to change the display mode of the thermometer 100 depending on the usage of the thermometer 100. Rectal temperature measurements are considered to be the most accurate by medical professionals, and it is a common practice to add a compensation factor, such as one or two degrees, to an axillary or oral reading to provide a rectal equivalent temperature. Thus, the supporting arm 112 can activate a mode switch 158 when placed in the open position so that the thermometer 100 calculates and displays the rectal equivalent temperature of the measured axillary temperature. The rectal equivalent temperature may be displayed by itself, or it may alternate with the actual temperature reading.

The mode switch 158 may be a mechanical switch (such as a microswitch) which is actuated by the movement of supporting arm 112. The mode switch 158 may also be implemented by other types of switches. For example, a Hall effect switch utilizing a magnet disposed in the supporting arm 112 may be used.

An audio output device 160 (such as a speaker) may be provided in the cavity of the main body 102. The speaker 160 is connected to the printed circuit board 118 and provides audible signals to a user. For example, the speaker 160 may indicate that the probe 104 has reached a final temperature.

Figure 6:
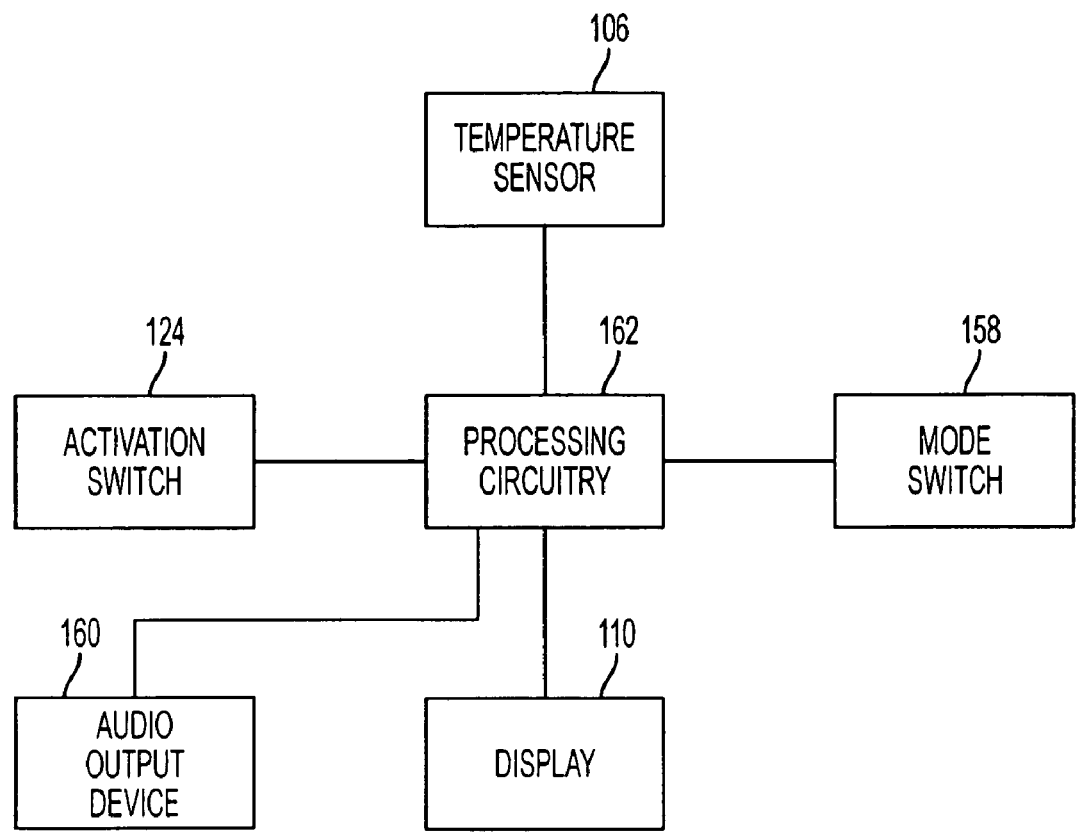
FIG. 6 is a block diagram of the electrical components of the thermometer of FIG. 1.

FIG. 6 is a block diagram of the dual use thermometer 100 illustrating the functions of the thermometer 100. The thermometer 100 includes the temperature sensor 106 for measuring temperature, processing circuitry 162 for determining the temperature of the temperature sensor 106 and displaying the measured temperature on the display 110, the activation switch 124 for activating features of the invention, and the mode switch 158 for changing the display mode of the thermometer 100.

Figure 7:
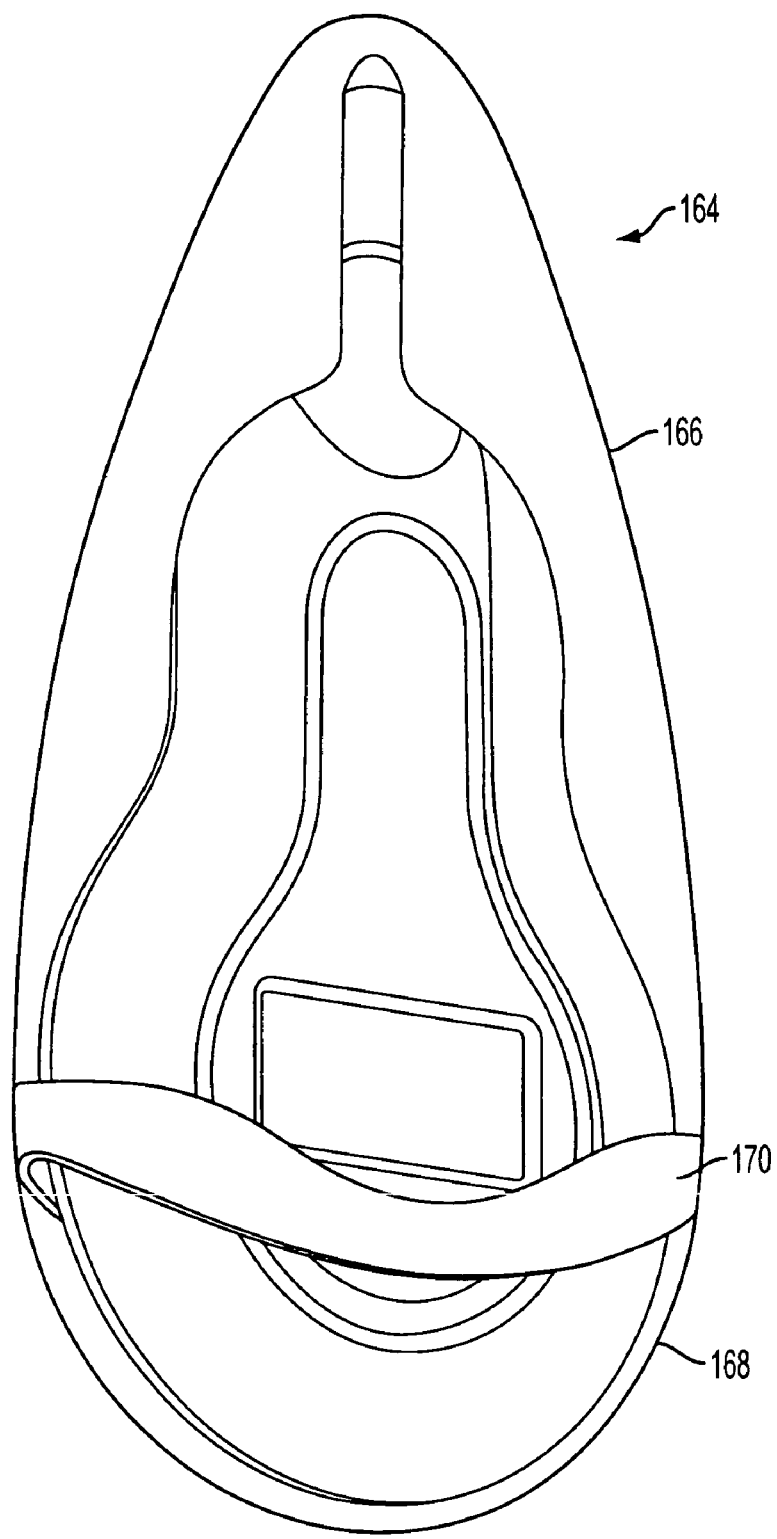
FIG. 7 is a diagram of a case for holding the thermometer of FIG. 1.

FIG. 7 is a perspective view of a case 164 for holding the thermometer 100 of the present invention. The case includes a top half 166, a bottom half 168, and a ring 170 to join the top and bottom halves together. The interior of the case is hollow to hold the thermometer 100.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A thermometer for measuring body temperature, comprising:
   a body;
   a probe having a base portion fastened to the body and a tip portion disposed away from the body;
   a sensor for detecting a living being's temperature disposed on the probe; and
   an arm movably attached to the body so that it can pivot between a first position and a second position, wherein in the first position the arm is positioned away from the probe and in the second position the arm is positioned adjacent to the probe.

2. A thermometer according to claim 1, wherein the body comprises a curved body that forms a seat for accommodating the arm.

3. A thermometer according to claim 1, further comprising a switch activated by the arm to change the mode of the thermometer.

4. A thermometer according to claim 1, further comprising a switch to activate a function of the thermometer.

5. A thermometer according to claim 1, wherein in the second position, the arm forms a retaining surface for supporting the probe to measure axillary temperature.

6. A thermometer according to claim 5, wherein in the first position, the length of the probe is adapted to measure rectal temperature.

7. A thermometer according to claim 5, wherein in the first position, the length of the probe is adapted to measure oral temperature.

8. A thermometer for measuring body temperature, comprising:
   a body;
   a probe carried by the body, the probe having a tip portion disposed away from the body;
   a sensor for detecting a living being's temperature disposed on the probe; and
   a supporting arm pivotably attached to the body so that it can pivot between a closed position and an open position, wherein in the closed position the arm is positioned away from the probe and in the open position the arm is positioned away from the body to provide a retaining surface for positioning the probe.

9. A thermometer according to claim 8, wherein the body comprises a curved body that forms a seat for accommodating the supporting arm.

10. A thermometer according to claim 8, further comprising a switch activated by the supporting arm to change the mode of the thermometer.

11. A thermometer according to claim 8, further comprising a switch to activate a function of the thermometer.

12. A thermometer according to claim 8, wherein in the open position, the supporting arm forms a retaining surface for supporting the probe to measure axillary temperature.

13. A thermometer according to claim 12, wherein in the closed position, the length of the probe is adapted to measure rectal temperature.

14. A thermometer according to claim 12, wherein in the closed position, the length of the probe is adapted to measure oral temperature.

15. A thermometer for measuring body temperature, comprising:
    a probe having a base portion and a tip portion;
    a sensor for detecting temperature disposed on the tip of the probe; and
    means for providing a retaining surface for supporting the probe in an axillary region of a living being's body.

16. A thermometer according to claim 15, wherein the means for providing a retaining surface comprises:
    a body portion supporting the base portion of the probe;
    an arm pivotable between a closed position adjacent to the body portion and an open position away from the body to provide a retaining surface for supporting the probe.

17. A thermometer according to claim 16, further comprising means for switching an operating mode of the thermometer.

18. A thermometer according to claim 16, wherein in the open position, the arm forms a retaining surface for supporting the probe to measure axillary temperature.

19. A thermometer according to claim 16, wherein in the closed position, the length of the probe is adapted to measure rectal temperature.

20. A thermometer according to claim 16, wherein in the closed position, the length of the probe is adapted to measure oral temperature.

* * * * *